(No Model.)
C. H. IVES.
FIRE LADDER.
No. 447,429. Patented Mar. 3, 1891.
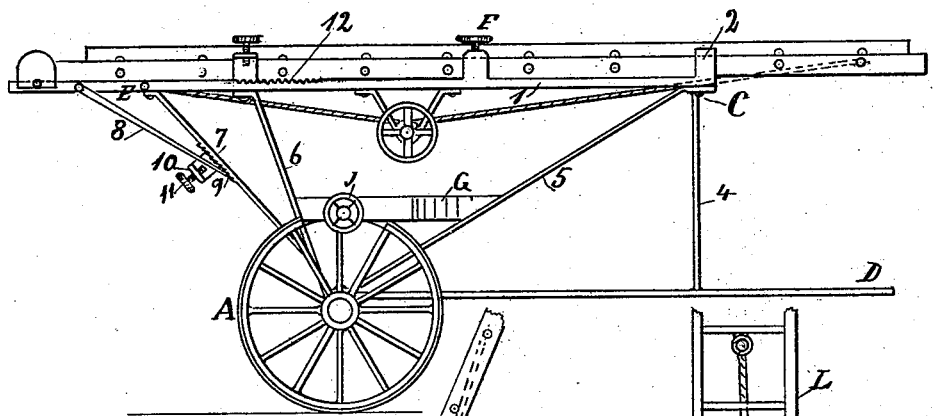
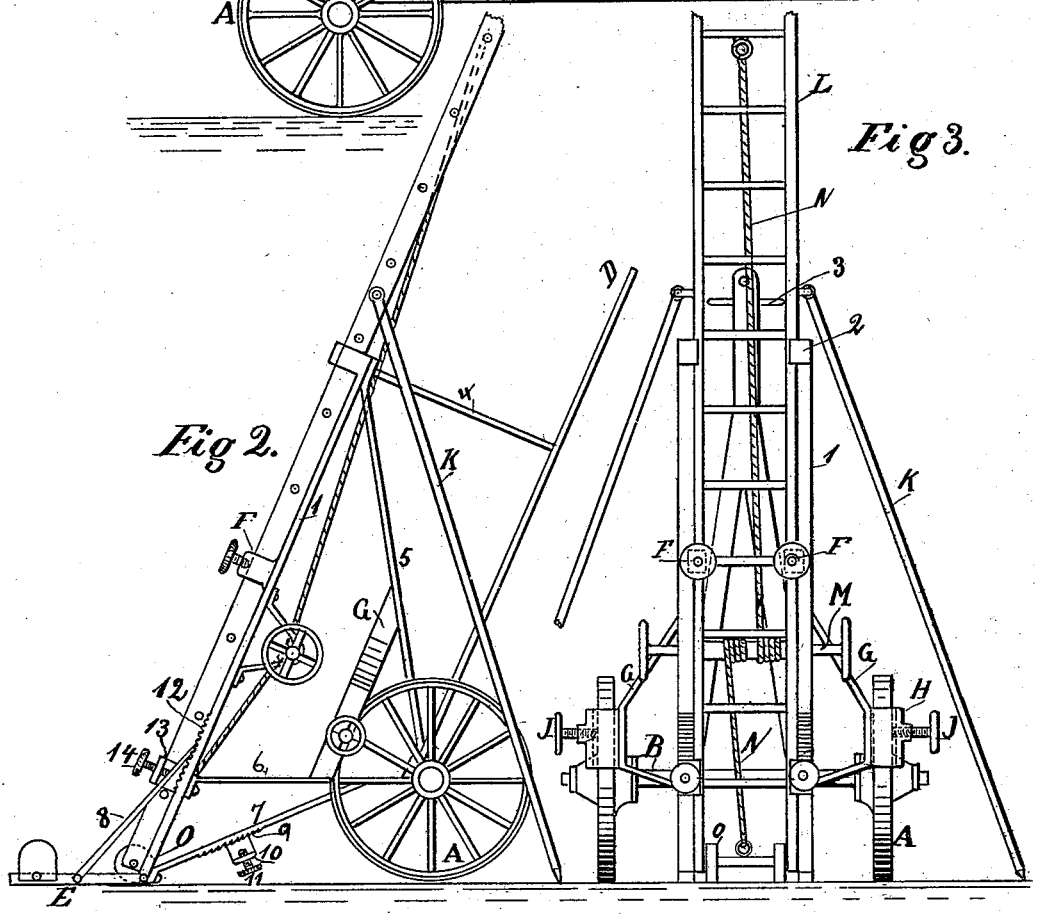
WITNESSES
Franz Burger
Karl Palmer
INVENTOR
Charles H. Ives.
by John G. Manahan
his Atty

UNITED STATES PATENT OFFICE.

CHARLES H. IVES, OF STERLING, ILLINOIS.

FIRE-LADDER.

SPECIFICATION forming part of Letters Patent No. 447,429, dated March 3, 1891.

Application filed November 17, 1890. Serial No. 371,718. (No model.)

*To all whom it may concern:*

Be it known that I, CHARLES H. IVES, a citizen of the United States, residing at Sterling, in the county of Whiteside and State of Illinois, have invented certain new and useful Improvements in Fire-Ladders; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in fire-ladders adapted to be carried upon and operated from and in conjunction with a truck.

The object of my invention is, first, to provide means of transporting and operating the ladder, and also to assist in raising it into place while upon the truck, using the axle of the ladder as a fulcrum in elevating the ladder; second, means for readily changing the position thereof when in an elevated position, and, third, for rigidly securing the ladder or ladders in place while in an elevated position and in use. I attain these objects by the mechanism in the accompanying drawings, in which—

Figure 1 is a side elevation of my invention in position for transportation. Fig. 2 is a side elevation thereof in one of its positions for use. Fig. 3 is a partial view of the upper side of my invention with the ladder elevated as in Fig. 2.

In my invention the main portion of the apparatus is supported and carried upon a two-wheeled truck, the axle of which forms the pivotal fulcrum for elevating and lowering the frame which supports the ladders.

A A are the carrying-wheels. B is the axle thereof. C is the frame supported upon said axle in any suitable way, and consisting of the side plates 1, provided with ways 2 to retain the ladders in the usual way.

From the axle B there is extended forward a reach D, adapted to be coupled to a conveyance of any nature for transportation, or it may be provided with a cross-pin 3 for hand-draft. If desired, the reach D may be an ordinary tongue or pair of thills, by which a horse may be attached directly to the apparatus. From the intermediate portion of the reach D there rises a standard 4, rigidly attached at its respective ends to the frame C and said reach, and which serves to strengthen and support the front end of said frame. From the axle B there is projected diagonally upward and forward a brace 5, which further supports and braces the front end of said frame. A similar brace 6 is projected diagonally upward and rearward from said axle, and rigidly attached at its upper end to the frame C. A secondary rear brace 7, suitably attached at its lower end to the lower portion of the brace 6, is rigidly attached at its upper end to the frame C, to the rear of the attachment of brace 6, and serves the double function of an auxiliary brace and an adjustable seat for the platform-brace hereinafter named.

To the rear end of the frame C there is suitably hinged a platform E, adapted, when the frame C is in a horizontal position, (shown in Fig. 1,) to serve as a rearward prolongation of said frame, and when the said frame is in the elevated position shown in Fig. 2 the platform E is brought into the proper angle therewith and adapted to lie upon the surface of the ground, and by placing men or weights upon said platform the lower end of the frame C and the ladders sustained thereby may be held rigidly from slipping. A brace 8 is pivotally seated at its upper end on the side of the platform E, and adapted at its lower end when said platform is on the same plane with said frame to engage at its lower end in the ratchets 9, formed upon the lower surface of brace 7, and thereby hold said platform in the position shown in Fig. 1. A thumb-screw seat 10 is formed on brace 7, and thumb-screw 11, seated therein in position to be forced against the adjacent surface of brace 8 and hold the same in engagement with said ratchet. When the frame C is in the elevated position shown in Fig. 2 the brace 8 is thrown upward and sprung into the ratchets 12, formed upon the upper surface of the said plate 1 of the frame C, and held in such engagement by a similar screw-seat 13 and thumb-screw 14.

The main advantage of the platform E is to furnish a suitable support for the ladders in transportation, and at the same time fold out of the line of prolongation of said frame when the latter is raised into position for use, so as to permit the erection of said frame into as nearly a vertical position as may be desired.

It will be noticed in Fig. 2 that the frame C with its supported ladder is nearly, or quite as nearly, vertical as would be required in use; but the rearward extension of the frame C may be so shortened, if desired, as to permit said frame to assume an absolutely perpendicular position, and the platform C may be made proportionately longer or shorter, and may be hinged to the frame C at any point forward of that shown in Fig. 1, in which event the rearward extension of the frame C would be less, as aforesaid.

F is a clamp suitably seated on the frame C to assist in holding the ladder in position.

G is a frame suitably attached laterally to the side of the frame C, and supporting a box H over the rim of the wheel A. In either wall of the box H is seated a hand-screw J, adapted to have its inner end forced tightly against the adjacent side of the rim of said wheel as a means of locking the latter rigidly to prevent rocking when the apparatus is in use. The advantage of this mode of locking the wheels over that of the ordinary rubber is that the latter reacts upon the frame, and is likely to move the apparatus out of position, while in the devices just described the wheel is simply clamped in the direction of the side of the truck, substantially in the line of the axle thereof.

K K are the usual guy-poles and legs of the lower ladder L. M is the usual windlass suitably seated under the frame C, and provided with the ropes N N, projecting fore and aft therefrom, and attached respectively to the upper and lower portions of the lower ladder L, as a means of moving the latter either forward or back upon the frame C.

Any required number of ladders can be carried upon the frame C and successively extended for use in the usual mode. On the lower end of the lower ladder L are pivotally seated small wheels or rollers O, which, when the apparatus is elevated as shown in Fig. 2, support the weight of the ladders upon the ground and furnish an easy and convenient means for moving the foot of the ladder toward the building in conjunction with the carrying-wheels A.

The advantages of my invention are that it provides a cheap and convenient mode of holding, transporting, and placing a fire-ladder in position; that the weight of the ladders and platform E are nearly balanced over the axle B when in position for transportation, and the frame C with said ladders is thereby readily tilted upward in the position shown in Fig. 2. In the early stages of the upward tilt of the frame C, with its imposed ladders, the lower ends of said ladder L will first rest upon the earth, and by means of the legs K and drawing on the windlass M and pushing the lower end of ladder L inward on wheels O, the ladder can be elevated into the position shown in Fig. 2, or into any other desired elevation when the apparatus, resting upon the two rollers O O and the two wheels A A, can be readily pushed to or from the building.

The apparatus, resting upon four wheels, as aforesaid, in conjunction with the steadying-platform E, is thereby furnished such a broad base in every direction, that in connection with the brace-legs K the same may be erected and held in position for use without any support from the building, or without being in contact with the latter, and therefore the apparatus may be erected at a safe distance from the burning building, and hose carried up the ladders, and the water delivered through the windows of the building under conditions where it would be unsafe to place a ladder against the building.

After the necessity for its use is passed, the apparatus can be readily placed in position for return by drawing the ladders backward on the frame C and tilting the latter forward, as in Fig. 1.

It will be understood that the description aforesaid is largely of duplicate parts, and the description of one of said parts is intended to apply equally to its counterpart.

What I claim as my invention, and desire to secure by Letters Patent of the United States, is—

1. In a fire-ladder, the combination of an axle B, suitably supported upon carrying-wheels, a ladder-bearing frame C, supported a sufficient distance above the ground to be permitted to be tilted on said axle, as shown, and a platform E, suitably hinged to the rear end of said frame, substantially as shown, and for the purpose described.

2. In a fire-ladder, the combination of an axle B, supported upon suitable carrying-wheels, a frame C, supported upon said axle in position to be tilted thereon, as described, and the lower ladder L, adjustably seated on said frame and provided with base-supporting rollers O substantially as shown, and for the purpose described.

3. In a fire-ladder, the combination of an axle B, supported upon suitable carrying-wheels, a ladder-supporting frame C, seated upon said axle as its pivotal point, carrying-wheels A, and the wheel-lock G H J, attached to said frame and adapted to hold said carrying-wheels from rotation when the apparatus is in use, substantially as shown, and for the purpose described.

4. In a fire-ladder, the combination of an axle B, supported upon suitable carrying-wheels, a frame C, suitably supported upon said axle as its pivotal seat, the platform E, hinged to the rear end of said frame and adapted to optionally form either an extension of the latter or a brace therefor, and means, substantially as shown, for carrying and extending a fire ladder or ladders on said frame, for the purpose described.

In testimony whereof I affix my signature in presence of two witnesses.

CHARLES H. IVES.

Witnesses:
JOHN G. MANAHAN,
V. S. FERGUSON.